United States Patent [19]
St John et al.

[11] Patent Number: 6,059,445
[45] Date of Patent: May 9, 2000

[54] MIXING APPLIANCE

[75] Inventors: Robert A. St John, Cheshire, Conn.;
John D. McNair, Palm Springs Yeun Long NT., The Hong Kong Special Administrative Region of the People's Republic of China; Wong Man Bun, Mong Kok, The Hong Kong Special Administrative Region of the People's Republic of China; Siu Kwai Keung, Ma On Shan NT., The Hong Kong Special Administrative Region of the People's Republic of China

[73] Assignee: HP Intellectual Corp., Wilmington, Del.

[21] Appl. No.: 09/058,224

[22] Filed: Apr. 10, 1998

[51] Int. Cl.[7] .................................. B01F 7/02; H01H 3/20
[52] U.S. Cl. ............................................ 366/205; 200/332
[58] Field of Search ...................................... 366/205, 206, 366/601, 314; 200/5 R, 5 A, 6 R, 16 R, 520, 528, 529, 533, 341, 345, 332, 332.1, 343, 16 B, 335

[56] References Cited

U.S. PATENT DOCUMENTS

| | | |
|---|---|---|
| 2,309,347 | 1/1943 | Landgraf . |
| 2,530,455 | 11/1950 | Forss . |
| 2,758,623 | 8/1956 | Malz et al. . |
| 2,940,738 | 6/1960 | Posener et al. . |
| 3,139,917 | 7/1964 | Elmore . |
| 3,211,878 | 10/1965 | Holden ................................ 200/332 |
| 3,493,215 | 2/1970 | Edwards et al. .................. 241/282.1 |
| 3,678,288 | 7/1972 | Swanke et al. . |
| 3,881,705 | 5/1975 | Greenspan . |
| 3,908,100 | 9/1975 | Richard et al. ....................... 200/5 A |
| 4,434,340 | 2/1984 | Kondo ................................. 200/332 |
| 4,874,912 | 10/1989 | Kakuta et al. ..................... 200/16 D |
| 4,889,248 | 12/1989 | Bennett . |
| 4,892,413 | 1/1990 | Vats ..................................... 366/349 |

*Primary Examiner*—W. L. Walker
*Assistant Examiner*—Terry K. Cecil
*Attorney, Agent, or Firm*—Barry E. Deutsch

[57] ABSTRACT

A blender 30 includes a base housing 32, a jar mount 34 which nests on the housing, and a jar 36, which is threadedly attached to the jar mount. A motor 66 is contained within the base housing 32 and drives a blending implement 74 located within the base of the jar 36. The jar mount 34 rests on a plurality of compliant pads 88 to support the jar mount and the jar 36 during operation of the blender 30. An extension 42 of the base housing 32 provides an enclosure for a switch assembly 68 which includes four switches 96 for facilitating external control of the operation of the motor 66 and the blender 30. Each of four compliant actuator pads 54 extend through respective openings 148 in a cover 50 of the extension 42 and engage a respective actuator block 158 which is mounted on a pivotable panel 152. When any of the actuator pads 54 is depressed by an operator, a respective one of the panels 152 is pivoted to move a section of the panel into actuating engagement with a switch plunger 100 of a respective one of the switches 96 to operate the motor 66 and, thereby, the blender 30.

12 Claims, 6 Drawing Sheets

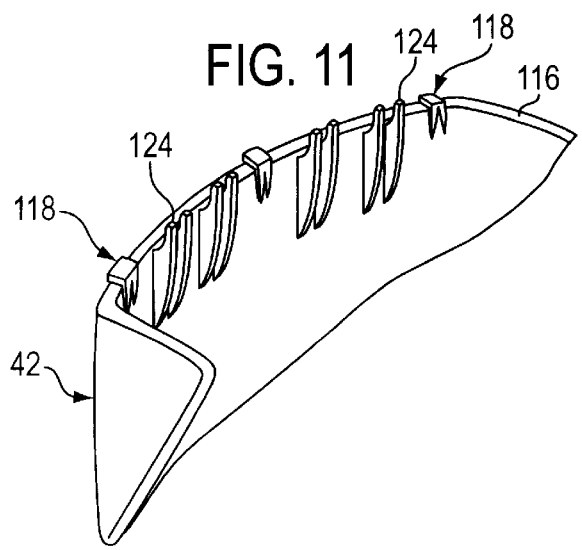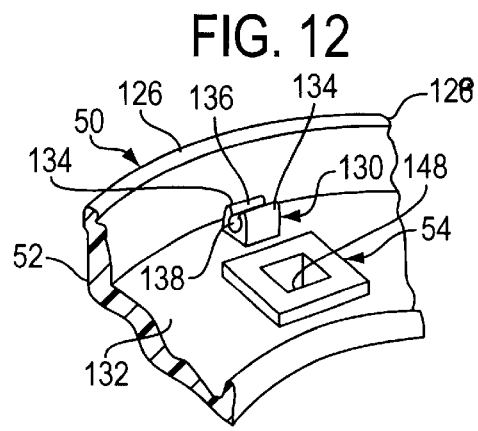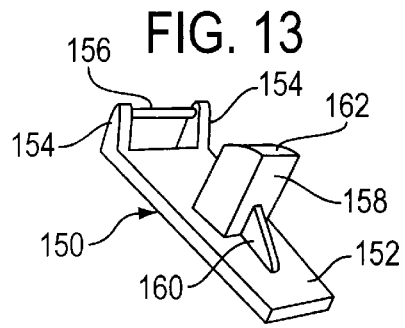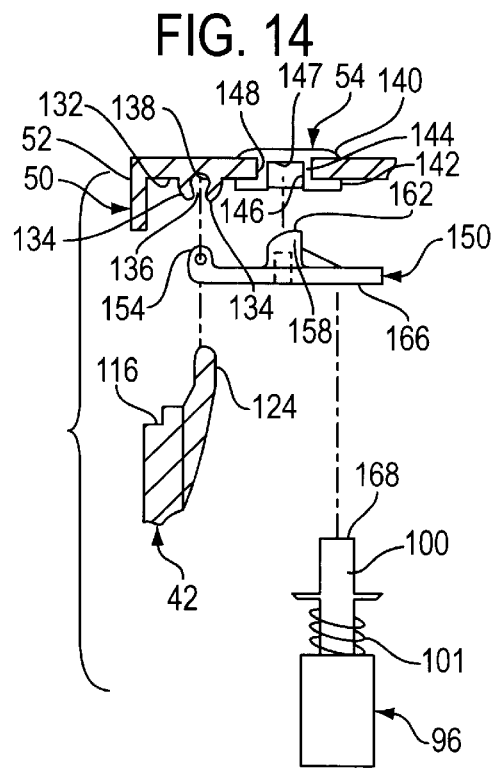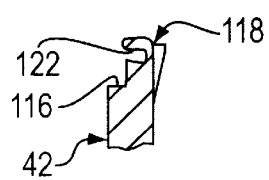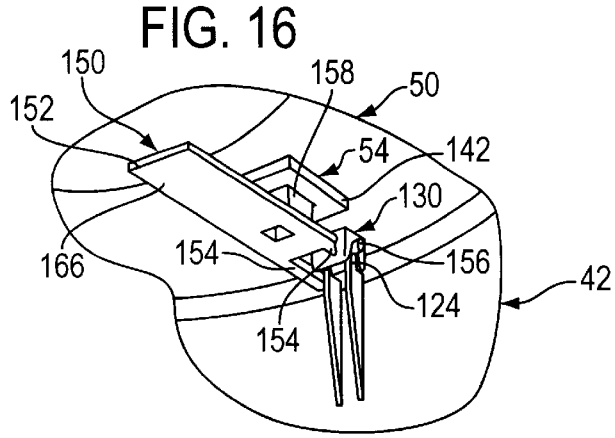

MIXING APPLIANCE

BACKGROUND OF THE INVENTION

This invention relates to a mixing appliance, and particularly relates to a power-operated blender typically used as a kitchen appliance to process foodstuff such as, for example, the mixing of liquids, the blending of solids and liquids, and the liquefying of fruits and vegetables.

Typically, a blender includes a base housing which contains an electric motor. A jar with a lid is positionable on, and usually secured to, a jar mount of the housing and includes a mixing implement which is coupled to a drive shaft of the motor when the jar is positioned on the housing. Various control buttons are located on the exterior of the housing to provide for external control of the motor during the operation of the blender.

In use of the blender, the jar is placed on and typically secured to the jar mount of the base housing and the lid is removed to reveal an opening of the jar. Selected foodstuff is deposited into the jar and the lid is then placed over the opening of the jar. Selected buttons are then manipulated to operate the motor whereby the implement works the foodstuff into a desired blend and consistency. The jar is removed from the housing and the lid is removed to access the blended foodstuff.

In some instances the jar mount is removably attached to the base housing for operation of the blender wherein the jar is typically mountable in single position only with respect to the housing. This single available position of the jar relative to the housing may not be convenient for the user. To accommodate this potential inconvenience, other blenders have been developed in the past which provide a few additional options for selective location of the jar relative to the base housing.

Still other blenders have been developed in the past which have facility for supporting the jar mount in essentially any position on the housing. Examples of this type of blender are shown in U.S. Pat. No. 2,940,738, which issued on Jun. 14, 1960, to A. L. A. Posner et. al., and U.S. Pat. No. 3,139,917, which issued on Jul. 7, 1964 to A. E. Elmore.

The blender of U.S. Pat. No. 2,940,738 includes a jar mount which is attached to a jar at the base thereof. The jar mount is formed with a flared skirt which fits over and rests on a circular shoulder formed at the top of a base housing located below the jar mount. The blender of U.S. Pat. No. 3,139,917 includes a base housing which is formed at the top thereof with a bowl-shaped opening having a circular upper edge covered entirely with a resilient material. A jar mount is attached to the bottom of a jar and includes a wall which seats on the resilient material of the circular edge of the opening.

In each of the above-noted patented blenders, a circular area of the underside of the jar mount seats fully on a circular rim at the top of the base housing to support the jar in position for operation of the blender. With this arrangement, the jar mount and the base housing are in full circular-area engagement in a horizontal plane. If the user attempts to rotate the jar mount on the base housing to reposition the jar, considerable frictional forces are encountered which must be overcome before the jar mount, and jar, can be repositioned.

Consequently, there is a need for a mounting arrangement which will permit repositioning of the jar mount on the base housing with relative ease while providing the necessary support of the jar and jar mount on the housing during operation of the blender.

As noted above, blenders typically include control buttons on the exterior thereof to facilitate operational control of the blender. Some examples of switches used in blenders are shown in U.S. Pat. No. 3,908,100, which issued on Sep. 23, 1975 to Carl E. Richard et.al., and U.S. Pat. No. 4,874,912, which issued on Oct. 17, 1989 to T. K. Higashiosaka et.al. In the switch actuating structure of each of these patents, the contact element or plunger of the switch is in direct alignment with the actuating button which is depressed by the user of the blender. As such, a relatively high and direct force is required to close the switch.

It is important that such buttons be in a clearly accessible location for user-friendly operation of the blender. It is also important that the buttons, and the facilities which couple the buttons to the switches, provide a firm coupling to the switch for prompt response to the user's depression of the selected button. It is also important that the coupling facilities provide a firm tactile response to the user when the switch has been actuated or deactuated. Additionally, it is important that the depression effort required by the user be accomplished with ease and minimal force.

Therefore, in a blender, there is a need for a switch coupling facility between the selector button and the associated switch which will provide a firm and fast coupling to the switch with relative ease and minimal exertion by the user, and also provide excellent tactile response.

SUMMARY OF THE INVENTION

Therefore, it is an object of this invention to provide a mixing appliance having a mounting arrangement which will permit repositioning of a jar mount on a base housing with relative ease while providing the necessary support of a jar and the jar mount on the housing during operation of the mixing appliance.

Another object of this invention is to provide a mixing appliance having a switch coupling assembly between an external selector button and an associated switch which will provide a firm coupling to the switch quickly and with relative ease and minimal exertion when the button is depressed by the user.

Still another object of this invention is to provide a mixing appliance with a switch coupling assembly which has a strong tactile response upon actuation or deactuation of an associated switch.

With these and other objects in mind, this invention contemplates a mixing appliance having a base housing, a jar mount, and a jar attachable to the jar mount. The base housing is formed with a surface which interfaces with a surface of the jar mount.

A plurality of intermediate spaced supports are located between the interfacing surfaces of the base housing and the jar mount to support the jar mount.

This invention further contemplates a mixing appliance having a base housing, a motor having a plurality of terminals and operable in a plurality of different speed modes, and a plurality of switch assemblies for operating the motor at selected speeds. Each of the plurality of switch assemblies includes an actuator pad having a central vertical axis and located externally of the base housing for selective access thereto, a switch for connection to a selected one of the plurality of motor terminals, and a switch plunger having a central vertical axis, wherein the central vertical axis of the switch plunger is horizontally spaced and horizontally offset from the central vertical axis of the actuator pad. Each of the plurality of switching assemblies further includes a linking element located within the base housing and situated between the actuator pad and the offset switch plunger for moving the switch plunger when the actuator pad is moved in a prescribed direction to close the switch.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 11 is a perspective view showing an upper front edge of an extension of the housing of FIG. 1 in accordance with certain principles of the invention;

FIG. 12 is a partial perspective view showing an underside of a cover of the housing extension of FIG. 11 in accordance with certain principles of the invention;

FIG. 13 is a perspective view showing an actuator pad in accordance with certain principles of the invention;

FIG. 14 is an exploded view showing a relationship of the switch of FIG. 7, the housing extension of FIG. 11 and the extension cover of FIG. 12 with the actuator pad of FIG. 13 in accordance with certain principles of the invention;

FIG. 15 is a sectional view showing a latch tab formed on the housing extension of FIG. 11 in accordance with certain principles of the invention; and FIG. 16 is a perspective view showing a switch actuator assembly which includes, in assembly, the interior of the housing extension of FIG. 11, the extension cover of FIG. 12 and the actuator paddle of FIG. 13 in accordance with certain principles of the invention.

DETAILED DESCRIPTION OF THE PREFERRED EMBODIMENT OF THE INVENTION

Figure 1:
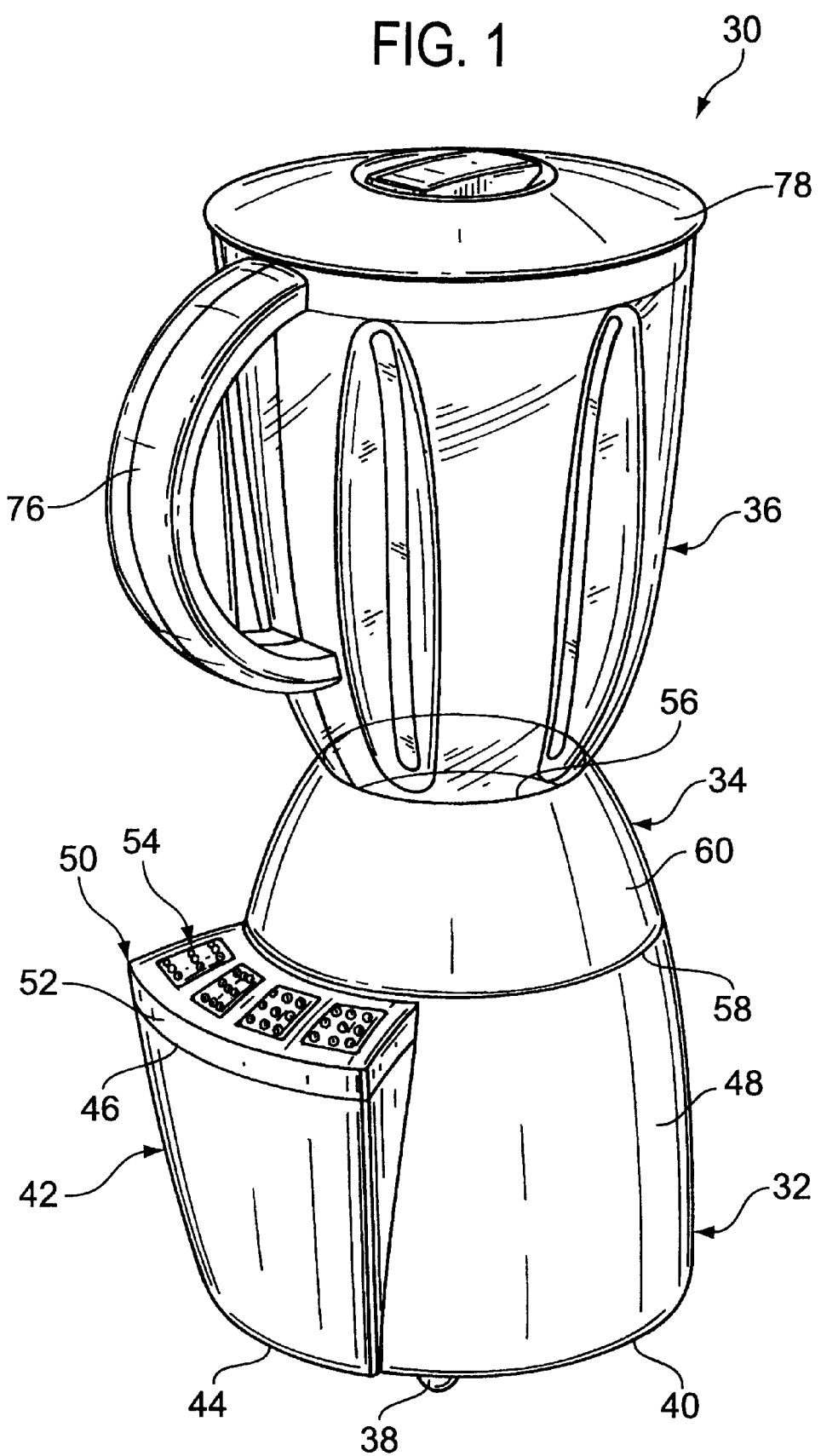
FIG. 1 is a perspective view showing a blender.
Figure 2:
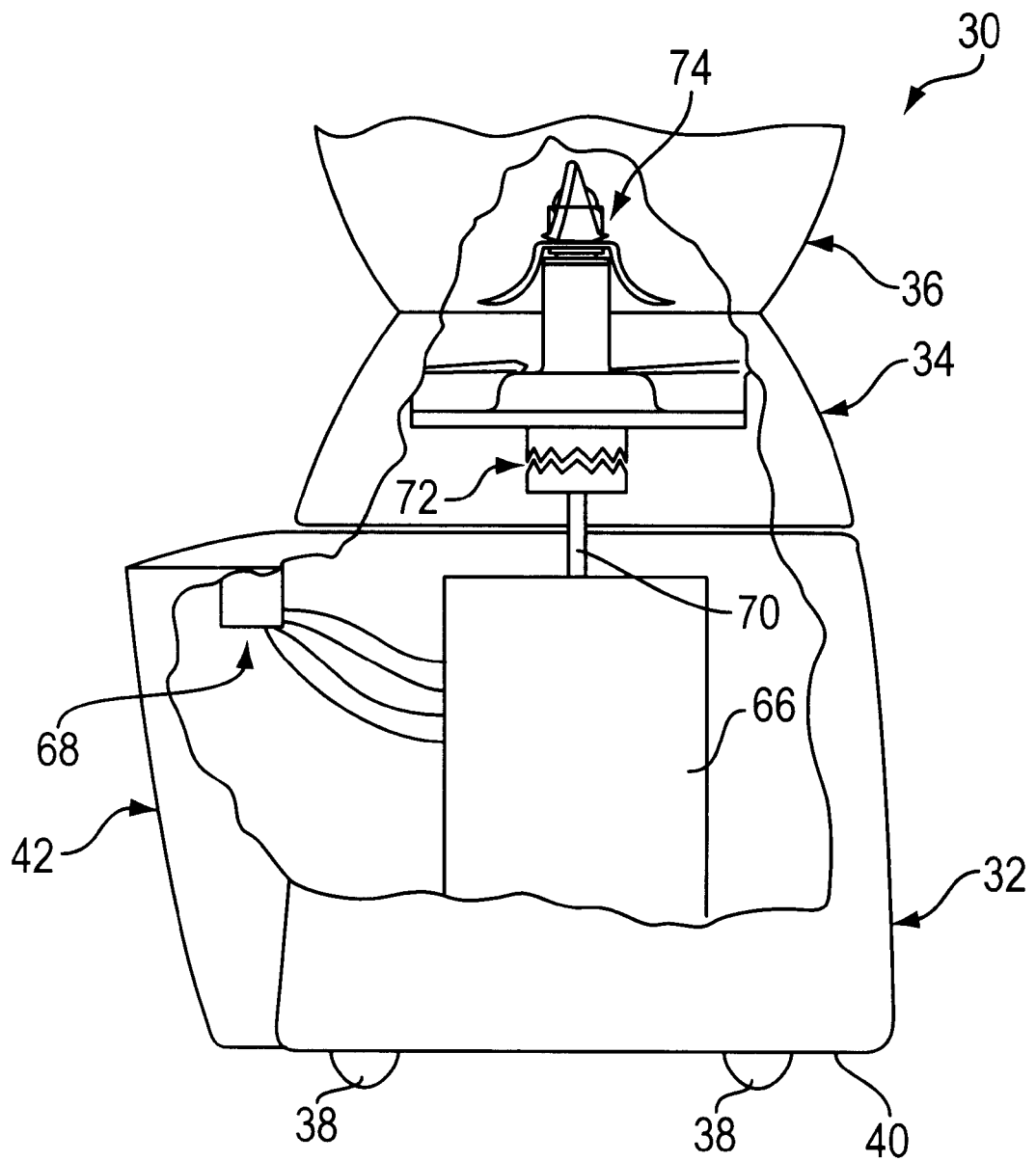
FIG. 2 is a partial side view of the blender of FIG. 1 with parts broken away showing features of the blender including a motor.

Referring to FIGS. 1 and 2, a mixing appliance, such as a blender 30, includes a base housing 32, a jar mount 34 and a jar 36. A plurality of feet 38 are located on a bottom 40 of the base housing 32 which is formed with a housing extension 42. The extension 42 includes a bottom 44 which extends laterally away from the base housing 32 for a prescribed distance in a plane in which the bottom 40 of the base housing is located. A top 46 of the extension 42 extends laterally from a side wall 48 of the base housing 32 near a top thereof. A cover 50, formed with a front side wall 52, is situated on the top 46 of the extension 42 and supports four compliant actuator pads 54.

The jar mount 34 is formed with a planar top edge 56 of a prescribed diameter and a planar bottom edge 58 spaced from the top edge and having a diameter larger than the prescribed diameter. A curved or conical wall 60 of the jar mount 34 is formed with a prescribed curvature as the surface extends between the top edge 56 and the bottom edge 58 thereof. The conical wall 60 of the jar mount 34 blends with a exterior curved shape of the base housing 32.

Figure 3:
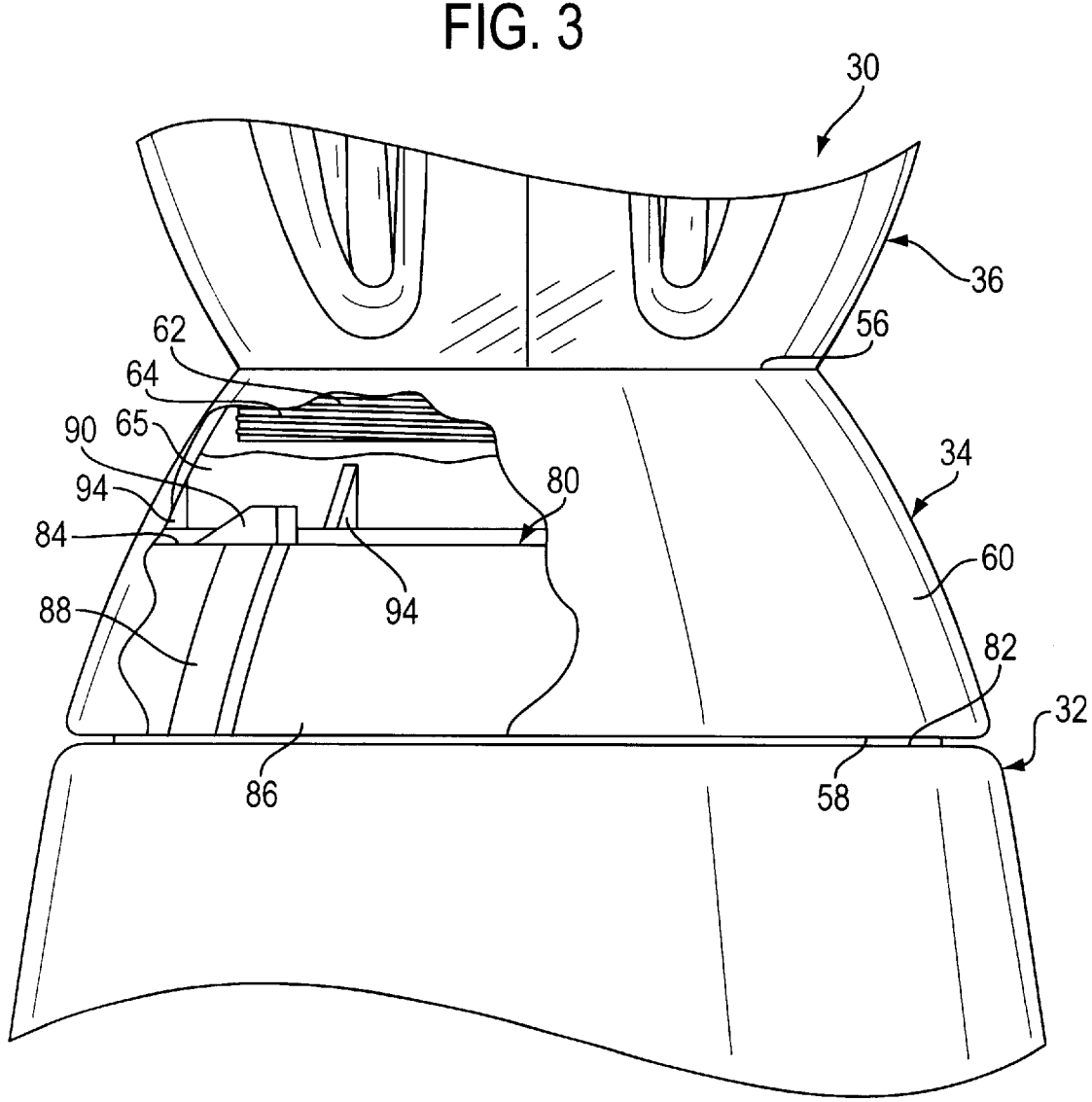
FIG. 3 is front view of the blender of FIG. 1 with parts broken away showing a mounting pad on a jar support in accordance with certain principles of the invention.

As shown in FIG. 3, the base of the jar 32 is formed with threads 62 which mount into corresponding threads 64 formed in an interior wall of a circular rim 65 formed in the interior of the jar mount 34. Referring to FIG. 2, an electric motor 66 is mounted within the base housing 32 and is connectable to an external electrical power source through a switch assembly 68 located within the extension 42. A drive shaft 70 is coupled to, and driven by, the motor 66. A mechanical coupling 72 couples the drive shaft 70 to a blending implement 74 located within the base of the jar 36. Upon selective operation of the motor 66, the implement 74 is rotated at selected speeds to mix and blend any foodstuff located within the jar 36, which is formed with a handle 76 and has a lid 78 locatable within a top opening of the jar as shown in FIG. 1.

Figure 4:
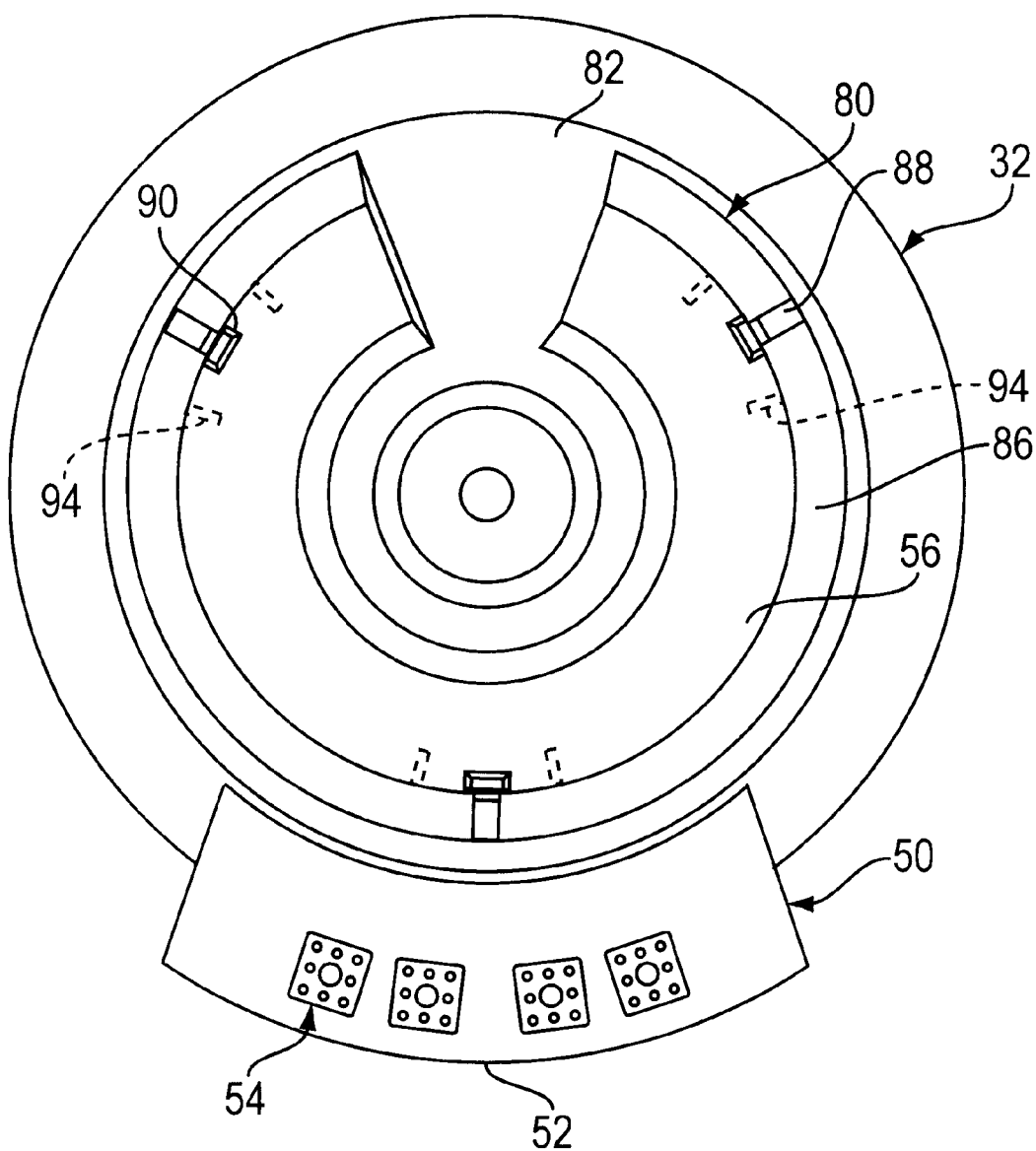
FIG. 4 is a top view of the jar support of FIG. 3 showing three mounting pads in accordance with certain principles of the invention.

Referring to FIGS. 3 and 4, a semi-dome-like extension 80 is formed on a top surface 82 of the base housing 32 and extends upward to an upper flat surface 84 thereof. A side surface 86 of the extension 80 is conically shaped in a manner consistent with the conical shape of the curved surface 60 of the jar mount 34 and in the prescribed curvature. The side surface 86 is of such a size that it will fit into the shell of the jar mount 34 in a complimentary fashion. Three resilient pads 88 are attached to, and are spaced equally around, the side surface 86. In addition, three stop blocks 90 are formed on, and are spaced equally around, the upper surface 84 of the extension 80.

As shown in FIG. 3, the circular rim 65 is formed within the jar mount 34 in an upper portion thereof and, as noted above, an inner circular wall of the rim 65 is formed with the threads 64 for receipt of the threads 62 of the jar 36. A plurality of ribs 94 extend radially outward from the rim 65 and are located in a circular path in which the stop blocks 90 are also fixedly located. Referring to FIG. 4, the ribs 94 are shown in phantom and are separated into three sets of two ribs each. The ribs 94 of each set are located on opposite sides of a respective one of the three stop blocks 90. The ribs 94 could be located farther apart, and farther from the respective stop block 90 without departing from the spirit and scope of the invention.

In use, the jar 36 is threadedly attached to the jar mount 34 and the jar mount is placed over the extension 80 of the base housing 32 and rests on the resilient pads 88. As noted above, the jar mount 34 and the extension 80 are both formed in the prescribed curvature. In addition, each of the pads 88 is formed with a prescribed uniform thickness from bottom to top thereof. When the jar mount 34 is placed over the extension 80, portions of the inner curving wall of the extension comes to rest on the radially outward surfaces of the pads 88. The pads 88 thereby provide a cushioning support for the jar mount 34, and also facilitate a frictional engagement therebetween which provides the necessary retention of the jar mount with the extension 80 and the base housing 32. During operation of the blender 30, the weight of the jar mount 34 and the jar 36, with the food stuff contained therein, develops sufficient compression of the jar mount into the pads 88 to frictionally retain the jar mount and jar in any desired position relative to the base housing 32. This allows the user to mount the jar mount 34 and jar 36 in the most comfortable and user-friendly position for the user, rather than being restricted to a single, and sometimes a user-unfriendly, position of other blenders.

In the event that the jar mount 34 would tend to creep in a rotary direction during use of the blender 30, one of the ribs 94 of each set of ribs would move toward, and ultimately engage, the respective stop block 90. This would result in the cessation of any further tendency of the jar mount 34 to creep during operation of the blender 30. The use of the ribs 94 in conjunction with the stop blocks 90 is the preferred embodiment. Use of the preferred embodiment allows the user to position the jar mount 34 and the jar 36 generally in any position with respect to the base housing 32 except those few positions where the stop blocks 90 and the ribs 94 are in interference in a direction axially of the blender 30.

Figure 5:
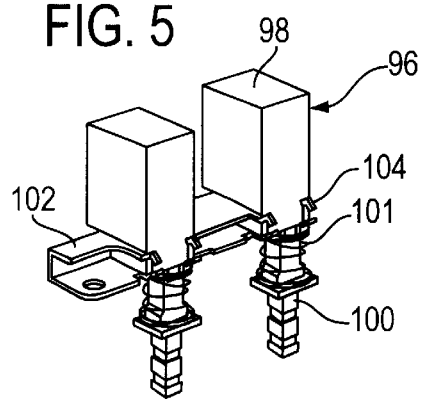
FIG. 5 is a perspective view showing two switches mounted on a support channel which are located in the housing of the blender of FIG. 1.
Figure 6:
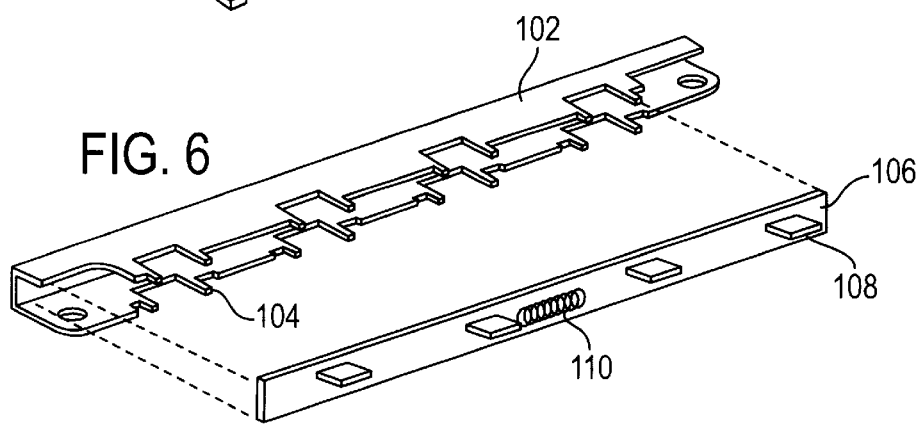
FIG. 6 is a perspective view showing the support channel of FIG. 5 and a latch bar.
Figure 7:
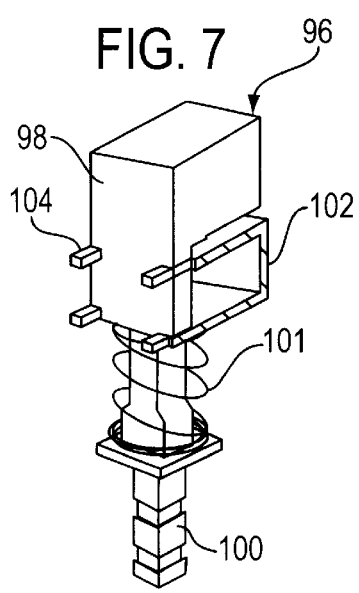
FIG. 7 is a perspective view of one of the switches of FIG. 5.

The switch assembly 68 shown in FIG. 2 includes four electrical switches 96, two of which are shown in FIG. 5. Each of the switches 96 is formed with a housing 98, a plunger actuator 100 and a plunger-biasing spring 101. Referring to FIGS. 5, 6 and 7, each switch 96 is secured to a channel support 102 by a series of twistable or bendable tabs 104 formed on the support. The switch assembly 68 further includes a slide bar 106 formed with four tabs 108 extending from a common side of the bar. The bar 106 is biased by a spring 110 to assume a rest position when the blender 30 is not in use.

Each of the four switches 96 is associated with a respective one of the compliant pads 54 (FIG. 4), and are arranged so that the leftmost pad and switch provide control for pulsing operation of the blender 30 as well as deactuation of any of the remaining three switches to disconnect operating power from the blender. The remaining three switches are used to control operation of the blender 30 at various speeds.

Figure 8:
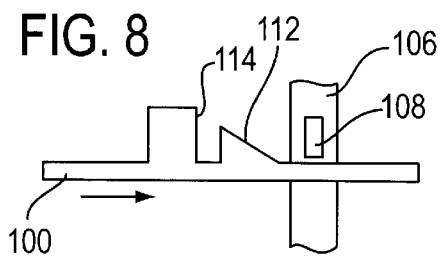
FIGS. 8, 9 and 10 are partial views showing successive positions of an actuator slide of the switch of FIG. 7 relative to the latch bar of FIG. 6 during and after depression of the switch.
Figure 9:
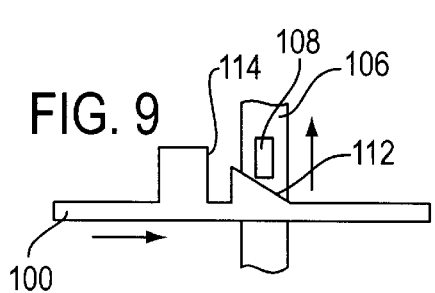
Figure 10:
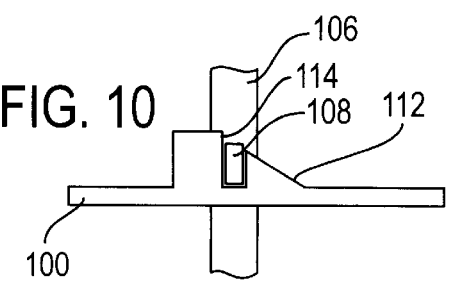

Referring to FIGS. 8, 9 and 10, the actuator 100 of each of the three switches 96, excluding the leftmost switch, is formed with a ramp surface 112 and a latching notch 114 adjacent the end of the rise of the ramp surface. The actuator 100 of the leftmost switch 96 is formed with a ramp surface 112 only.

In operation, when one of the three switches 96, excluding the leftmost switch, is selected for actuation, the plunger 100 therefor is depressed to bias the spring 101 associated therewith. As shown in FIG. 8, the plunger 100 is thereby moved to the right where, as shown in FIG. 9, the ramp surface 112 engages and urges the respective tab 108, and the slide bar 106, upward to bias the spring 110. Eventually, as shown in FIG. 9, the tab 108 clears the ramp surface 112 and the biased spring 110 releases to move the slide bar 106 downward, as shown in FIG. 10, with the tab moving into the latching notch 114. In this condition, the associated spring 101 of the actuated switch 96 remains biased tending to urge the actuator 100 into a deactuated position. However, the selected switch 96 is now latched in the actuated position and the blender 30 operates accordingly.

When the user desires to stop the blender from operating, the user actuates the leftmost switch 96 whereby the associated ramp surface 112 urges the respective tab 108 and the slide bar 106 upward in the manner shown in FIG. 9. Near the end of this deactuation procedure, the slide bar 106 has been moved sufficiently so that the tab 108, which is associated with the latched switch 96, clears the latching notch 114. At that time, the biased spring 101 of the latched switch 96 returns the actuator 100 to its rest position and the switch is thereby deactuated.

The ramp surface 112, which is associated with the tab 108 of the leftmost switch 96, is of sufficient length to insure that the tab remains on the ramp surface during use of the leftmost switch. Therefore, the actuator 100 of the leftmost switch 96 will never facilitate the latching of the associated tab 108, but will return to its normal rest position under the action of the associated spring 101 when the actuator is released by the user. Also, when none of the switches 96 are in the actuated state, and the leftmost switch is actuated, the blender 30 will operate as long as the user holds the associated actuator 100 in the actuated state, but will deactuate as soon as the user releases the actuator. This provides for a pulsing operation of the blender 30.

Referring now to FIG. 11, the extension 42 is formed with an upper ledge 116. Each of a plurality of cover latches 118 are formed on an inside wall 120 of the extension 42 adjacent the ledge 116, and include a notch 122 (FIG. 15). Further, four pairs of support fingers 124 are formed on the inside wall 120 and extend above the ledge 116 of the extension 42.

As shown in FIG. 12, an outer edge 126 of the cover 50 is formed with a lip 128 which snaps into the notch 122 (FIG. 15) of the extension 42 upon assembly of the cover therewith. As shown in FIGS. 12 and 14, a pivot bar latch 130 is formed on an undersurface 132 of the cover 50 and includes two spaced walls 134, the outer ends of which are biased toward each other but are not in physical engagement, thereby forming a space 136 between the outer ends. Inner surfaces of the spaced walls 134 are formed with interfacing concave surfaces which form generally a cylindrical space 138 which is in communication with the space 136.

As shown in FIG. 14, each of the compliant actuator pads 54 is formed with an exterior flange section 140, an interior flange section 142 and a linking intermediate section 144. Also, each of the pads 54 is formed with an opening 146 which extends through the interior flange section 142 and the linking intermediate section 144 to a floor 147 of the opening, but not through the exterior flange section 140. The cover 50 is formed with four holes 148 which are located for assembly with the four compliant actuator pads 54.

Referring to FIG. 13, each of four transfer paddles 150 is formed with a generally flat support panel 152, spaced bar supports 154 at one end of the panel, a pivot bar 156 mounted in and extending between the bar supports, an actuator block 158 and a strengthening rib 160. The top of each of the actuator blocks 158 is formed with a generally curved surface 162.

In the following description, only the assembly of one paddle 150 with the cover 50 will be described, it being understood that the remaining three paddles are assembled with the cover in the same manner. Referring again to FIG. 14, the paddle 150 is moved toward the underside of the cover 50 to insert the actuator block 158 into the opening 146 of the compliant pad 54, and the pivot bar 156 is moved through the space 136 to slightly spread the outboard ends of the spaced walls 134 and allow the pivot bar to seat in the cylindrical space 138. After the pivot bar 156 is moved through the space 136, the outboard ends of the spaced walls 154 return to the normal position to effectively and removably capture the pivot bar within the cylindrical space. The rounded top surface 162 of the actuator block 158 is now located adjacent the floor 147 of the opening 146. It is noted that portions of the pivot bar 156 extend from opposite axial ends of the cylindrical space 138 and are located between the opposite ends of the pivot bar latch 130 and the respective bar supports 154.

The cover 50 is then assembled with the top of the extension 42 where the lip 128 of the cover snaps into the notches 122 of the cover latches 118 as described above. At the same time, the upper ends of the spaced pair of support fingers 124 move into supporting engagement with the exposed opposite ends of the pivot bar 156 located between the opposite ends of the pivot bar latch 130 and the respective bar support 154, as shown in FIG. 16. In this manner, the transfer paddle 150 is firmly mounted to the underside of the cover 50 for pivoting movement when the exterior flange 140 of the compliant pad 54 is depressed by the user. Also, an underside surface 166 (FIG. 16) of the support panel 152 of the paddle 150 engages a free end 168 (FIG. 14) of the actuator 100 of the switch 96.

To initiate operation of the blender 30, the user depresses a selected one of the compliant actuator pads 54 to move the actuator block 158 downward and pivot the support panel 152 about the axis of the pivot bar 156. During the pivoting movement of the panel 152, the upper portions of the actuator block 158 tends to develop a lateral component in the direction of its movement which, if the top surface of the block was flat, could create discomfort to the finger of the user. By virtue of the curved surface 162 at the top of the actuator block 158, the surface tends to "roll" as the panel 152 is pivoted which provides a comfortable tactile response to the user.

In addition, as the panel 152 is pivoted, the underside surface 166 of the panel 152 depresses the actuator 100 of the switch 96 to actuate and, except for the leftmost switch in FIG. 4, facilitate latching of the switch in the manner described above. When the user desires to terminate the operation of the blender 30, the user depresses and releases the leftmost switch as described above.

By use of the pivoting transfer paddles 150, the level of force required by the user to actuate the respective switch 96 results in a firm tactile response when the switch is actuated, thereby providing sensory reaction that the switch has been actuated. In addition, the underside surface 166 of the panel 152 is located a prescribed distance from the pivot bar 156. This prescribed distance provides a relatively higher downward velocity vector at the point of application of the force to the switch actuator 100, i.e., the underside surface 166, which accomplishes the actuation of the switch 96 at a rapid rate.

In general, the above-identified embodiments are not to be construed as limiting the breadth of the present invention. Modifications, and other alternative constructions, will be apparent which are within the spirit and scope of the invention as defined in the appended claims.

What is claimed is:

1. A mixing appliance, which comprises:
   a base housing;
   a motor, mounted in the base housing, having a plurality of terminals and operable in a plurality of different speed modes;
   a plurality of switch assemblies for operating the motor at selected speeds;
   each of the plurality of switch assemblies comprising:
      an actuator pad having a central vertical axis and located externally of the base housing for selective access thereto;
      a switch for connection to a selected one of the plurality of motor terminals;
      a switch plunger having a central vertical axis wherein the central vertical axis of the switch plunger is horizontally spaced and horizontally offset from the central vertical axis of the actuator pad;
      A linking element located within the base housing and situated between the actuator pad and the offset switch plunger for moving the switch plunger when the actuator pad is moved in a prescribed direction to close the switch.

2. The mixing appliance as set forth in claim 1, wherein the base housing comprises:
   a wall having a ledge formed thereon;
   a plurality of cover latches formed on the wall adjacent the ledge and extending away from the ledge;
   each of the cover latches formed with a snap notch;
   a cover for assembly with the wall at a juncture with the ledge; and
   the cover formed with a lip which snaps into the notches of the cover latches when the cover is assembled with the wall.

3. The mixing appliance as set forth in claim 1, which further comprises:
   the base housing including a wall with an inside surface and an outside surface and formed with an opening therethrough,
   the actuator pad extending through the opening of the wall of the base housing and exposed on the outside wall for operator contact;
   the actuator pad formed with an opening which extends into the actuator pad from the inside surface of the wall to a floor at the base thereof; and
   wherein the linking element comprises:
   a transfer paddle mounted within the base housing;
   an actuator block formed on the transfer paddle which is located within the opening of the actuator pad; and
   a top of the actuator block being formed with a curved surface which is positioned within the opening of the actuator pad in an interfacing relation to the floor of the opening.

4. The mixing appliance as set forth in claim 1, wherein the linking element comprises:
   a transfer paddle mounted within the base housing in engagement with the actuator pad for movement thereof upon movement of the actuator pad;
   a pivot bar attached to the transfer paddle;
   and which further comprises:
   a pivot bar latch formed on an inside surface of the base housing for supporting the pivot bar to facilitate pivotal movement of the transfer paddle.

5. The mixing appliance as set forth in claim 4, wherein the transfer paddle further comprises:
   a support panel;
   an actuator block formed on the support panel which is located within an opening of the actuator pad from within the base housing; and
   a top of the actuator block being formed with a curved surface which is positioned within the opening of the actuator pad in an interfacing relation to the floor of the opening.

6. The mixing appliance as set forth in claim 4, which further comprises:
   a plurality of support fingers formed on an inner surface of the base housing having portions which engage the pivot bar to assist in retaining the pivot bar with the pivot bar latch.

7. The mixing appliance as set forth in claim 1, which further comprises:

a plurality of switches, corresponding in number to the number of the plurality of switch assemblies, located within the base housing and electrically connected on one side thereof to the plurality of terminals of the motor, and connectable to a power source on the other side thereof;

and wherein said linking element comprises:

a transfer paddle pivotally mounted at a first end thereof to an inside surface of the base housing;

a second end of the transfer paddle, spaced from the first end thereof, located adjacent the switch plunger of a respective one of the plurality of switches;

and each of the plurality of switch assemblies further comprises:

means accessible from the exterior of the base housing for selectively pivoting the transfer paddle associated with the respective one of the plurality of switches for closing the switch to operate the motor at a selected speed.

8. A mixing appliance, which comprises:

a base housing;

a motor mounted within the base housing and connectable to a power source for operation thereof;

at least one switch located within the base housing having an actuating element for selectively connecting the motor to the power source, wherein the actuating element has a central vertical axis;

a transfer paddle mounted for movement within the base housing;

a portion of the paddle located adjacent to the switch actuating element; and means having a central vertical axis, wherein the central vertical axis of said means is horizontally offset and horizontally spaced from the central vertical axis of the switch actuating element and accessible from the exterior of the base housing for selectively moving the transfer paddle to engage and move the actuating element and to thereby close the switch.

9. The mixing appliance as set forth in claim 8, wherein the transfer paddle comprises:

a platform, an actuator block formed on an intermediate section of the platform and positioned for engagement with the transfer paddle moving means;

a first end of the platform being mounted for pivotal movement;

a second end of the platform positioned adjacent to the actuating element of the switch;

where, upon selective activation of the transfer paddle moving means, the platform is pivoted at the first end to move the second end thereof into switch actuating engagement with the actuating element.

10. The mixing appliance as set forth in claim 9, which further comprises:

a pivot bar attached to the first end of the paddle;

a pivot bar latch formed on an inside surface of the base housing for supporting the pivot bar for pivotal movement relative to the base housing.

11. The mixing appliance as set forth in claim 9, wherein the transfer paddle moving means comprises:

the base housing including a wall with an inside surface and an outside surface and formed with an opening therethrough, an actuator pad extending through the opening of the wall of the base housing and exposed on the outside wall for operator contact;

the actuator pad formed with an opening which extends into the actuator pad from the inside surface of the wall to a floor at the base thereof; and the actuator block being located within the opening of the actuator pad.

12. The mixing appliance as set forth in claim 11, which further comprises:

a top of the actuator block being formed with a curved surface which is positioned within the opening of the actuator pad in an interfacing relation to the floor of the opening.

* * * * *